No. 889,807. PATENTED JUNE 2, 1908.
C. H. REYNOLDS.
PACKING.
APPLICATION FILED FEB. 14, 1908.

Charles H. Reynolds, Inventor

Witnesses
H. R. Selden
F. S. Benham

By Geo. B. Selden,
Attorney

UNITED STATES PATENT OFFICE.

CHARLES H. REYNOLDS, OF ROCHESTER, NEW YORK.

PACKING.

No. 889,807.

Specification of Letters Patent.

Patented June 2, 1908.

Application filed February 14, 1908. Serial No. 415,869.

*To all whom it may concern:*

Be it known that I, CHARLES H. REYNOLDS, a citizen of the United States, residing at Rochester, in the county of Monroe, in the State of New York, have invented an Improvement in Packing, of which the following is a specification, reference being had to the accompanying drawing.

My invention relates to an improved packing for steam or other valves consisting of a suitable body or disk composed of vulcanized asbestos protected on its outer surface by a layer of suitable metal electrolytically deposited.

Figure 1:
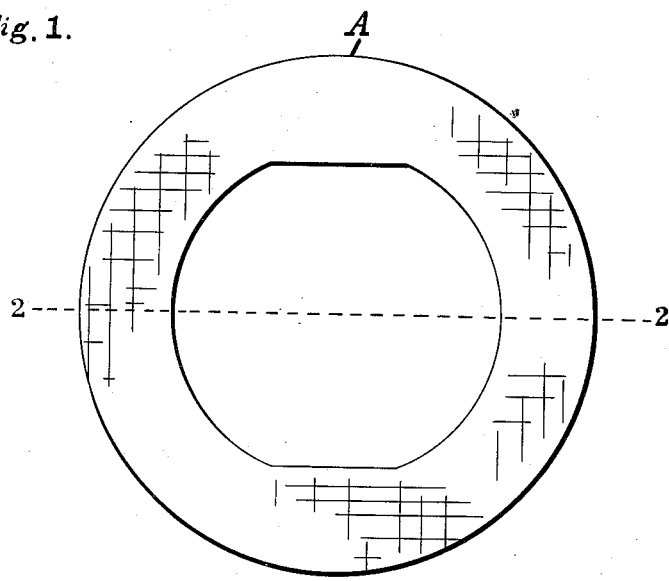
Figure 2:
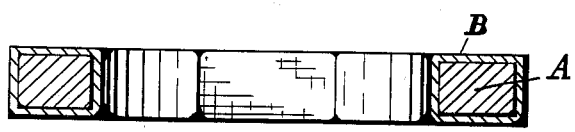

In the accompanying drawings, Figure 1 is a side view of a valve-disk embodying my invention. Fig. 2 is a section of the same on the line 2—2, Fig. 1.

In the manufacture of my improved packing, I mix fibrous asbestos with sulfur, black sulfid of antimony, litharge and about five per cent. of pure gum rubber. The rubber is dissolved in gasolene, benzene or other suitable solvent, and the solution is then thoroughly incorporated with the above mentioned ingredients in any suitable stirring apparatus. The proportions may be considerably varied, but satisfactory results are secured by the use of about eighty-five per cent. of the fibrous asbestos, which if preferred may be purified in any suitable manner or by any suitable treatment. After the ingredients have been fully mixed, the composition is dried into the condition of a moist plastic mass, after which it is ready to be pressed into any required shapes. Such operations are performed in any ordinary dies or molds, or the material may be rolled out into sheets. It is then vulcanized, by being subjected in a suitable closed vessel, to the desired degree of heat, which may vary from 160 to 375 degrees Fahrenheit. The higher the heat, the harder the composition after the vulcanizing. The vulcanizers are heated by steam,—a series of steam coils passing through them. I wrap the objects to be vulcanized before heating with moist cloths, such as cotton sheeting,—the vapor produced by such moisture assisting in making the product harder and more durable.

The vulcanized packing A or disks are now ready for the plating bath,—the thickness of the coating B depending on the length of the immersion therein,—which may be stated as ordinarily requiring about five hours,—but this may be decreased or made longer. The preferred thickness of the coating is usually about one-sixty-second of an inch, although this may be increased. The surface is rendered conductive by brushing it with powdered graphite. Either copper or nickel are preferably used for the protective coating, on account of cheapness, but the copper coating may in its turn be covered with any suitable metal.

My improved packing may be molded into any suitable shapes,—such as for flat disk valves, plug or conical valves, or other forms, and it may be vulcanized in sheets, and subsequently coated.

My improved packing is more durable than any other with which I am acquainted, it will resist higher pressures and remain permanently tight and durable for long period of time. It can also be used satisfactorily with various alkaline or saline liquids. The asbestos retains its fibrous character in the composition, and materially increases the strength. The longer the fiber, the better the product. The proportion of the antimony may be reduced or it may be omitted entirely, the amount of litharge being increased, if desired.

I claim,

1. The herein described packing, consisting of a compressed mixture of fibrous asbestos with suitable vulcanizing material and provided with a protective coating of a suitable electrolytically deposited metal, substantially as described.

2. The herein described packing consisting of a compressed and vulcanized mixture of fibrous asbestos with sulfur, litharge and rubber, and provided with a protective coating of a suitable electrolytically deposited metal, substantially as described.

CHARLES H. REYNOLDS.

Witnesses:
F. S. BENHAM,
GEO. B. SELDEN.